(12) United States Patent
Morita (10) Patent No.: US 7,097,036 B2
(45) Date of Patent: Aug. 29, 2006

(54) CASSETTE STORING CASE (75) Inventor: Kiyoo Morita, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 517 days.

(21) Appl. No.: 10/640,308

(22) Filed: Aug. 14, 2003

(65) Prior Publication Data

US 2004/0045849 A1    Mar. 11, 2004

Related U.S. Application Data

(62) Division of application No. 10/218,073, filed on Aug. 14, 2002, now abandoned, which is a division of application No. 09/831,983, filed as application No. PCT/JP99/06276 on Nov. 11, 1999, now abandoned.

(30) Foreign Application Priority Data

Nov. 12, 1998   (JP)   .................... 10-322051

(51) Int. Cl.
     *B65D 21/36*    (2006.01)
(52) U.S. Cl. .................................... 206/501
(58) Field of Classification Search .................. None
     See application file for complete search history.

(56) References Cited

U.S. PATENT DOCUMENTS

| | | |
|---|---|---|
| 3,381,810 A | 5/1968 | Lasher et al. |
| 3,407,961 A | 10/1968 | Box |
| 4,184,594 A | 1/1980 | Hehn |
| 4,275,943 A * | 6/1981 | Gelardi et al. ............. 312/9.57 |
| 4,291,801 A | 9/1981 | Basili et al. |
| 4,420,079 A | 12/1983 | Gliniorz et al. |
| 4,844,263 A | 7/1989 | Hadtke |
| 5,038,235 A | 8/1991 | Ohzawa et al. |
| 5,383,557 A | 1/1995 | Weisburn et al. |
| 5,445,268 A | 8/1995 | Suzuki |
| 5,529,183 A | 6/1996 | Nishikawa |
| 5,560,481 A | 10/1996 | Doodson et al. |
| 5,692,623 A | 12/1997 | Todor et al. |
| 5,699,925 A | 12/1997 | Petruzzi |
| 6,019,230 A | 2/2000 | Hayashi |

FOREIGN PATENT DOCUMENTS

| | | |
|---|---|---|
| DE | 196 13 640 A | 10/1996 |
| EP | 0 709 848 A2 | 5/1996 |
| GB | 2 094 761 A | 9/1982 |
| JP | 56-134369 | 10/1981 |
| WO | WO 98/49684 A1 | 11/1998 |

* cited by examiner

*Primary Examiner*—Stephen Castellano
(74) *Attorney, Agent, or Firm*—Sughrue Mion, PLLC

(57) ABSTRACT

A cassette 5 with longitudinal and transverse dimensions similar to each other is housed in a cassette storing case which can prevent housing of a cassette into the housing case in an incorrect direction and identify a dedicated cassette storing case corresponding to a cassette, while assuring the function of preventing positional shift during stacking. The cassette storing case 1 includes an indicating portion 15 provided on the top surface 1a of the housing case. The indicating portion 15 has a protrusion-and-recess pattern, similar to a design on the cassette, which indicates a housing direction. The cassette storing case 1 further includes a stopper portion 17, provided on the bottom surface 1b of the housing case, for engaging with part 16 of the indicating portion 15 to regulate positional shift when housing cases are stacked with each other.

6 Claims, 8 Drawing Sheets

CASSETTE STORING CASE

This application is a divisional of ser. No. 10/218,073 filed Aug. 14, 2002 now abandoned, which is a divisional of Ser. No. 09/831,983 filed May 14, 2001 now abandoned, which was the National Stage of International Application PCT/JP99/06276 filed Nov. 11, 1999, the disclosure of which is incorporated herein by reference.

TECHINICAL FIELD

The present invention relates to the structure of a cassette storing case that houses, for example, a magnetic tape cassette (also called a magnetic tape cartridge) in which a single reel with magnetic tape wound thereon is rotatably housed within a cassette case.

BACKGROUND ART

A magnetic tape cassette in which a single reel with magnetic tape wound thereon is rotatably housed in a flat cassette case having a generally square flat form, and a disk cassette in which a disk is rotatably housed in a flat cassette case having a generally square flat form, have recently been used to back up data stored on memory for computers.

These cassettes vary in form, depending on manufacturers. However, a wide variety of cassettes with similar outside dimensions are manufactured to provide for interchangeability between library units of different manufacturers. There are cases where cassettes of different types are archived or used together. For example, an LTO cassette and a DLT cassette are used in approximately the same applications. The LTO cassette and the DLT cassette are approximately the same in width, but the LTO cassette is smaller in inserting-direction length and height than the DLT cassette.

These cassettes are usually housed in their dedicated cassette storing cases when not being used, such as when being conveyed, when being archived, etc. In addition, the cassette is provided with a recording member, such as a bar code label, a memory chip, etc., for identifying the recorded contents. The cassette is housed in the cassette storing case in a fixed direction so that the recording member, such as a bar code, etc., can be read out even in the housed state.

Furthermore, the cassette and the cassette storing case are generally provided with a structure for regulating positional shift when stacked, in order to enable transfer, transportation, and conveyance when stacked. For instance, the cassette is provided on the bottom surface with protrusions and the cassette storing case is provided on the top surface with recesses. When they are stacked, the protrusions are fitted into the recesses to regulate positional shift between them.

Hence, most of the cassettes are similar in longitudinal and transverse dimensions, and it is troublesome to identify the longitudinal and transverse lengths of a cassette and house the cassette into a housing case in a fixed direction. Because of this, there is a problem that housing of a cassette in an incorrect direction will disable reading of the aforementioned recording member.

To prevent housing of a cassette in an incorrect direction, it is possible to provide protrusions, such as reverse-insertion preventing ribs, etc., in a cassette storing case so that when inserted in an incorrect direction, the cassette is projected by the protrusions and thus the lid of the housing case is not closed. However, there will be a fear of a cassette being damaged, if the user closes the lid forcibly without being aware of an error in the housing direction. Furthermore, if cassettes of different kinds, slightly different in outside dimensions but similar in form, are used together, it will become difficult to identify a dedicated cassette storing case corresponding to each cassette. Thus, there will also be a fear that (1) a cassette will be housed in an incorrect housing case, (2) a cassette or a housing case will be damaged, and (3) archiving will be confused.

The present invention has been made in view of the points mentioned above. Accordingly, it is a first object of the present invention to provide a cassette storing case which is capable of preventing a cassette from being housed in an incorrect direction and easily identifying a dedicated cassette storing case corresponding to a cassette, while assuring the function of preventing positional shift that would be caused during stacking.

In cases where different cassette storing cases are manufactured for housing two kinds of magnetic tape cassettes (also called magnetic tape cartridges), identifying the correspondence between a cassette and a cassette storing case to house each cassette into a dedicated housing case is troublesome and reduces operability.

That is, in the case where the same user frequently uses two kinds of cassettes at the same place and archives them in the same library unit, the fear of damage to the cassette and the housing case and confusion in archiving will arise if the cassette is forcibly housed in an incorrect housing case.

Hence, it is preferable to house two kinds of cassettes in the same cassette storing case. In this case, the housing case is formed into a dimension that can house the larger cassette. For this reason, if the smaller cassette is housed in the housing case, there will arise a fear that (1) the smaller cassette will tend to move easily, (2) the cassette and the housing case will rub against each other because of vibration during conveyance, and (3) etching will occur. Thus, it is necessary to house the smaller cassette so that it is not moved within the housing case. In addition, it is desirable to prevent the cassette from being housed in the cassette storing case in an incorrect direction and desirable not to disable reading of the aforementioned recording member. Furthermore, it is necessary that the existing cassettes be housed without changing the form of the cassettes solely for the purpose of housing the cassettes in the aforementioned cassette storing case.

The present invention has been made in view of the points mentioned above. Accordingly, it is a second object of the present invention to provide a cassette storing case which is capable of housing two kinds of cassettes without moving them in the interior.

DISCLOSURE OF THE INVENTION

To achieve the first object of the present invention mentioned above, there is provided a first cassette storing case for housing a cassette which has longitudinal and transverse dimensions similar to each other, including:

an indicating portion provided on a top surface of the housing case, the indicating portion having a protrusion-and-recess pattern, similar to a design on the cassette, which indicates a housing direction; and a stopper portion, provided on a bottom surface of the housing case, for engaging with part of the indicating portion to regulate positional shift when housing cases are stacked with each other.

To achieve the aforementioned first object, there is provided a second cassette storing case for housing a cassette, having longitudinal and transverse dimensions similar to each other, and provided with a protrusion and a recess on top and bottom surfaces thereof for regulating positional shift when cassettes are stacked with each other, the cassette storing case including:

an indicating portion provided on a top surface of the housing case, the indicating portion having a protrusion-and-recess pattern, similar to a design on the cassette, which indicates a housing direction; and a protrusion and a recess, provided on the top and bottom surfaces of the housing case at positions corresponding to the protrusion and recess of the cassette, for engaging with the protrusion and recess of the cassette to regulate positional shift when the cassette or housing cases are stacked.

In the first and second cassette storing cases, the top surface of the housing case is provided with the indicating portion having a protrusion-and-recess pattern, similar to a design on the cassette, which indicates a housing direction. With the indicating portion, these cassette storing cases have the following advantages: the corresponding relationship between the cassette storing case and a cassette to be housed can be easily identified at a glance; the cassette housing direction can also be easily recognized; housing of a cassette in an incorrect direction can be prevented even when it has longitudinal and transverse dimensions close to each other; and the cassette storing cases also have the function of preventing positional shift that would be caused during stacking.

In addition, the first cassette storing case includes a stopper portion, provided on the bottom surface of the housing case, for engaging with part of the indicating portion to regulate positional shift when housing cases are stacked with each other. In this case, the cassette storing case can be made structurally simpler, because the indicating portion can also be used for preventing positional shift.

The second cassette storing case includes a protrusion and a recess, provided on the top and bottom surfaces of the housing case at positions corresponding to the protrusion and recess of the cassette, for engaging with the protrusion and recess of the cassette. In this case, positional shift can be regulated when the cassette or housing cases are stacked. Positional shift can also be regulated when the cassette is placed on the housing case for the purpose of display.

To achieve the second object of the present invention mentioned above, there is provided a third cassette storing case for housing first and second cassettes which are nearly the same in width but different in inserting-direction length and height, the cassette storing case including:

a protrusion, provided on a rear wall surface of the housing case, which has an abutting end face engageable with a front surface of the first cassette smaller in inserting-direction length and an abutting bottom face engageable with a top surface of the first cassette lower in height;

wherein the protrusion is inserted into a recess, formed in a front surface of the second cassette greater in inserting-direction length and height, so that it does not interfere with the second cassette.

In the third cassette storing case, the abutting bottom surface of the protrusion may abut the top surface of a stepped portion of the first cassette. In this case, the stepped portion is used for preventing insertion in an incorrect direction. It is preferable to provide the abutting end face and the abutting bottom face in the same protrusion, because the number of protrusions can then be reduced.

According to the third cassette storing case for achieving the second object of the present invention mentioned above, the rear wall surface of the housing case is provided with a protrusion having a length equivalent to a difference in inserting-direction length between the first and second cassettes. The protrusion has an abutting end face engageable with the front surface of the first cassette smaller in inserting-direction length and an abutting bottom face engageable with the top surface of the first cassette lower in height. Therefore, when housing the first cassette into the housing case, movement of the first cassette in the inserting direction and vertical direction can be regulated by the aforementioned protrusion. When housing the second cassette into the housing case, the protrusion is inserted in the recess formed in the front surface of the second cassette greater in inserting-direction length and height, and does not interfere with the second cassette. Therefore, the second cassette can be housed without being moved, regardless of the aforementioned protrusion. Thus, two kinds of cassettes, which are nearly the same in width but different in inserting-direction length and height, can be housed in a common cassette storing case. For this reason, the third cassette storing case has the following advantages: it is unnecessary to identify a dedicated housing case; handing becomes satisfactory and operability is enhanced; and interchangeability between library units can be assured.

Furthermore, in the case where the first or second cassette is housed in an incorrect direction, the aforementioned protrusion interferes with the cassette and disables the housing of the cassette into the housing case. Thus, housing in an incorrect direction can be prevented and the cassette can be housed within a library unit in a fixed direction.

BEST MODE FOR CARRYING OUT THE INVENTION

First and second embodiments for achieving the first object of the present invention above mentioned will hereinafter be described with reference to the drawings.

First Embodiment

Figure 1A:
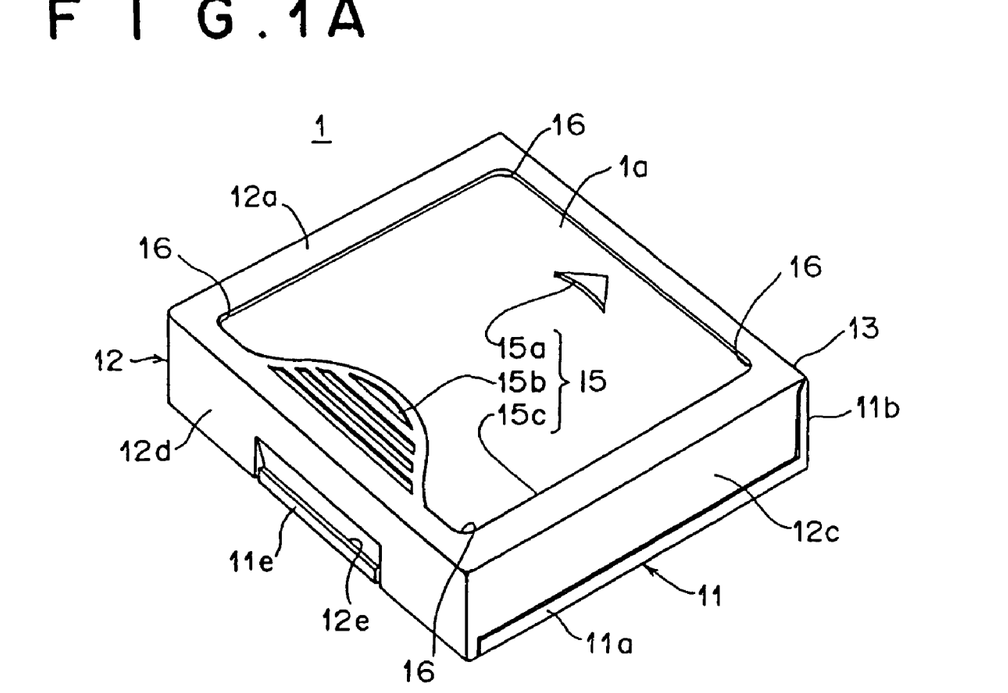
FIGS. 1A and 1C are perspective views of the top surface side of a cassette storing case according to a first embodiment of the present invention.
Figure 1B:
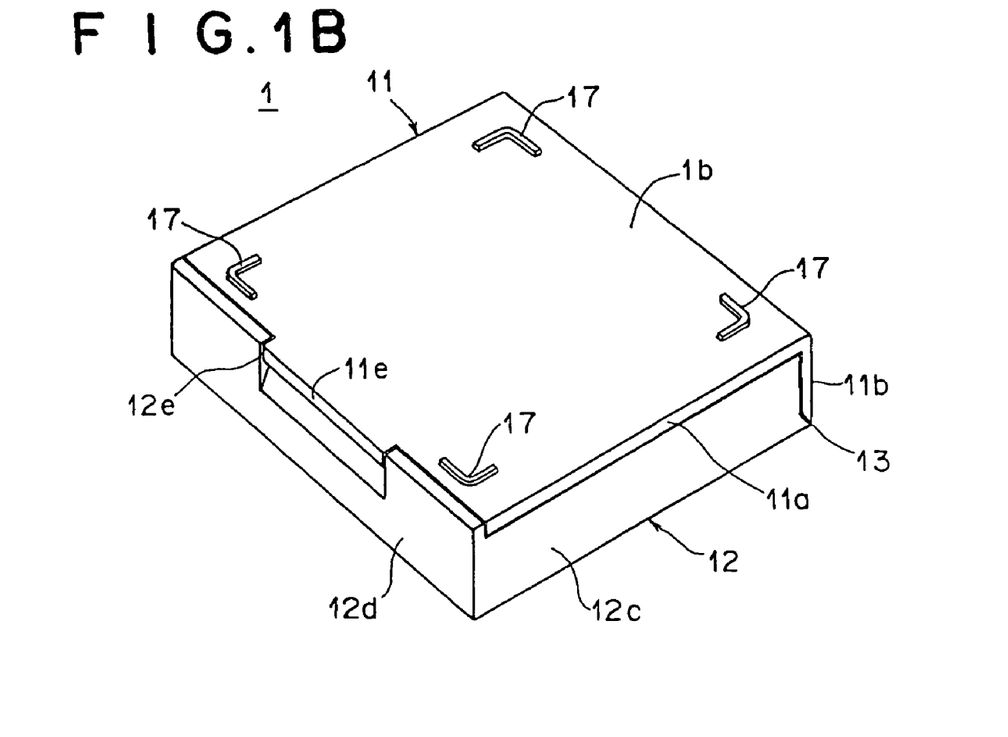
FIG. 1B is a perspective view of the bottom surface side of the cassette storing case according to the first embodiment of the present invention.
Figure 2:
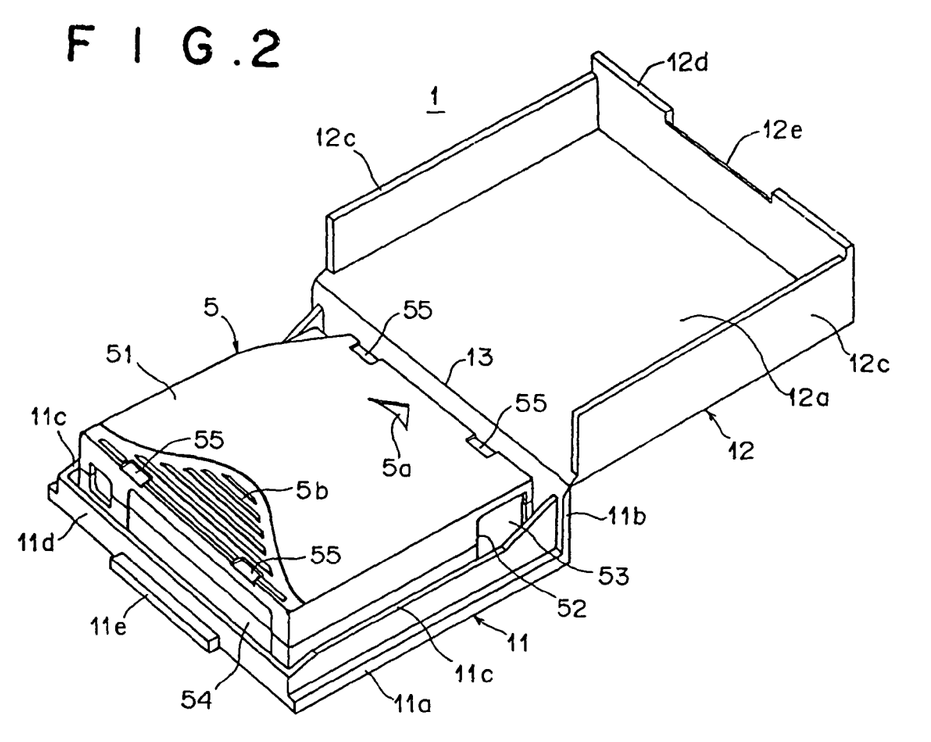
FIG. 2 is a perspective view of the state in which a cassette has been housed in the cassette storing case of FIG. 1 and a lid has been opened.
Figure 3:
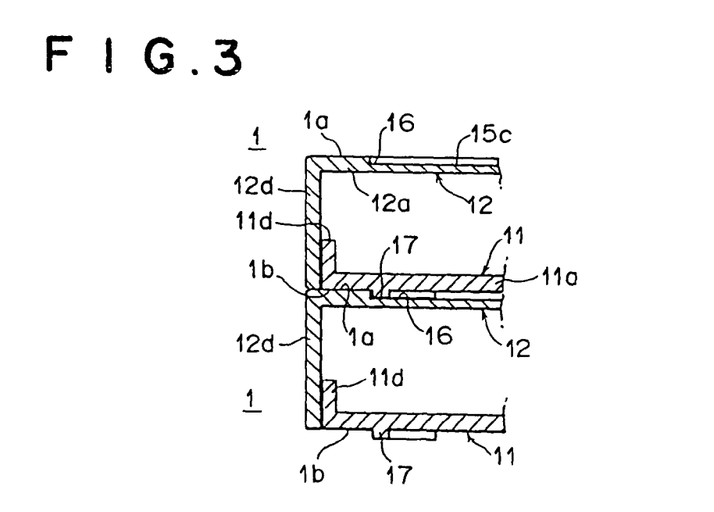
FIG. 3 is a part-sectional view of the state in which two cassette storing cases have been stacked.

FIG. 1A shows a perspective view of the top surface side of a cassette storing case in the first embodiment and FIG. 1B shows a perspective view of the bottom surface side of the cassette storing case in the first embodiment. FIG. 2 shows a perspective view of the state in which a magnetic tape cassette has been housed and a lid opened. FIG. 3 shows a part-sectional view of the state in which cassette storing cases have been stacked.

The cassette storing case 1 consists of a lower case main body 11 and an upper lid member 12 connected to the main body 11 through a thin connecting portion 13 so that it can be freely opened and closed with respect to the main body 11. Within the cassette storing case 1, a cassette (or a magnetic tape cassette) 5 shown in FIG. 2 is housed.

In the case main body 11, a vertical wall 11b is erected in the rear end of a flat bottom plate 11a. In addition, right and left side walls 11c are erected inside the side ends of the bottom plate 11a so that they become lower in height toward the front portion of the bottom plate 1a. Furthermore, a front wall 11d is formed low down in the front end of the bottom plate 11a. The space inside these walls 11b to 11d is used for housing the cassette 5. Also, a finger hanging portion 11e is formed to protrude from the front central portion of the bottom plate 11a.

On the other hand, in the lid member 12, the flat top plate 12a is connected at one end thereof to the upper edge of the vertical wall 11b of the case main body 11 through the thin connecting portion 13 so that it is freely rotatable with respect to the main body 11. Also, side walls 12c are erected in both side portions of the top plate 12a, and a front wall 12d is erected in the front end of the top plate 12a opposite to the thin connecting portion 13. Dimensions are set so that the side walls 12c and front wall 12d of the lid member 12 are fitted onto the side walls 11c and front wall lid of the case main body 11; the lower ends of the side walls 12 of the lid member 12 abut the top surface of the bottom plate 11a; and the bottom plate 11a and the top plate 12a are parallel with each other in the closed state of the lid member 12. The lower central portion of the front wall 12d of the lid member 12 is provided with a cutout 12e corresponding to the finger hanging portion 11e of the case main body 11. The front surface of the front wall 12d extends in taper form toward the cutout 12e, and in the closed state of the lid member 12, the upper end of the finger hanging portion 11e engages with the cutout 12e of the lower end of the tapered surface and is exposed.

To keep the closed state of the lid member 12, an engagement structure (not shown), consisting of a protrusion and a recess which engage with each other in the closed state, is provided between the side walls 11c of the case main body 11 and the side walls 12c of the lid member 12, or between the front wall 11d of the case main body 11 and the front wall 12d of the lid member 12.

In the aforementioned cassette 5 that is housed within the housing case 1, a single reel (not shown) with magnetic tape wound thereon is rotatably housed within a generally square cassette case 51 which has longitudinal and transverse dimensions similar to each other. As shown in FIG. 2, the cassette case 51 consists of an upper half and a lower half, made of plastic. The cassette case 51 has flat top and bottom surfaces. An opening 52 is formed in one of the side surfaces of the cassette case 51 to pull out one end of the magnetic tape from the cassette case 51 and is opened or closed by a slide door 53. Also, in the front surface of the cassette case 51, a region 54 is formed into the shape of a shallow recess so that a bar code label, etc., can be pasted.

The top surface of the cassette 5 has an arrow indication 5a, formed into the shape of a recess, which indicates a direction in which the cassette 5 is inserted into an external recording-reproducing unit. The front portion of the top surface of the cassette 51 has a design including a protrusion-and-recess pattern 5b (in the illustrated case, a mountain-shaped pattern overall) that functions as a holding portion when the cassette 5 is inserted or pulled out. In addition, the top surface of the cassette case 51 has four regulating recesses 55 for regulating positional shift when a plurality of cassettes 5 are stacked, at the front right and left end portions and rear right and left end portions. On the other hand, the bottom surface of the cassette case 51 has four regulating protrusions 56 (see FIG. 6 to be described later) at the same positions corresponding to the regulating recesses 55 in the top surface of the cassette case 51. When two cassettes 5 are stacked, the regulating protrusions 56 on the bottom surface of the upper cassette 5 are fitted into the regulating recesses 55 in the top surface of the lower cassette 5 so that positional shift is regulated in the longitudinal and transverse directions.

The cassette 5 is housed in a housing direction where the inserted end of the cassette 5 is housed in the rear end portion (near the thin connecting portion 13) of the cassette storing case 1. In the cassette storing case 1, at least the part of the front wall 12d of the lid member 12 is transparently formed so that a bar code label, etc., on the pasting region 54 of the cassette 5 can be read out.

In the housing case 1, the top surface 1a of the lid member 12 has an indicating portion 15, similar to the design on the cassette 5 mentioned above, which has a protrusion-and-recess pattern indicating the housing direction of the cassette 5 (see FIG. 1). More specifically, in the top surface 1a of the housing case 1, the central portion is formed into a shallow recess 15c, leaving behind the circumferential frame portion. In the front end portion, near the thin connecting portion 13c, of the recess 15c, an arrow indication 15a is formed with a protrusion pattern. The arrow indication 15a is similar to the arrow indication 5a indicating the inserting direction of the top surface of the cassette 5. In the rear end portion of the recess 15c, a protrusion-and-recess pattern 15b is formed and similar to the protrusion-and-recess pattern 5b which becomes the holding portion of the cassette 5 mentioned above. The indicating portion 15 enables recognition of the regular housing direction of the cassette 5 into the housing case 1.

The four right-angled corners of the recess 15c in the indicating portion 15 of the top surface 1a of the housing case 1 are provided as stopper recesses 16 for regulating positional shift during stacking.

On the other hand, the bottom surface 1b (see FIG. 1B) of the housing case 1 is provided with four stopper protrusions 17 in the form of a key at positions corresponding to the stopper recesses 16 in the top surface 1a. The stopper protrusions 17 are fitted into the right-angled stopper recesses 16 so that positional shift can be regulated when two housing cases 1 are stacked together.

Figure 1C:
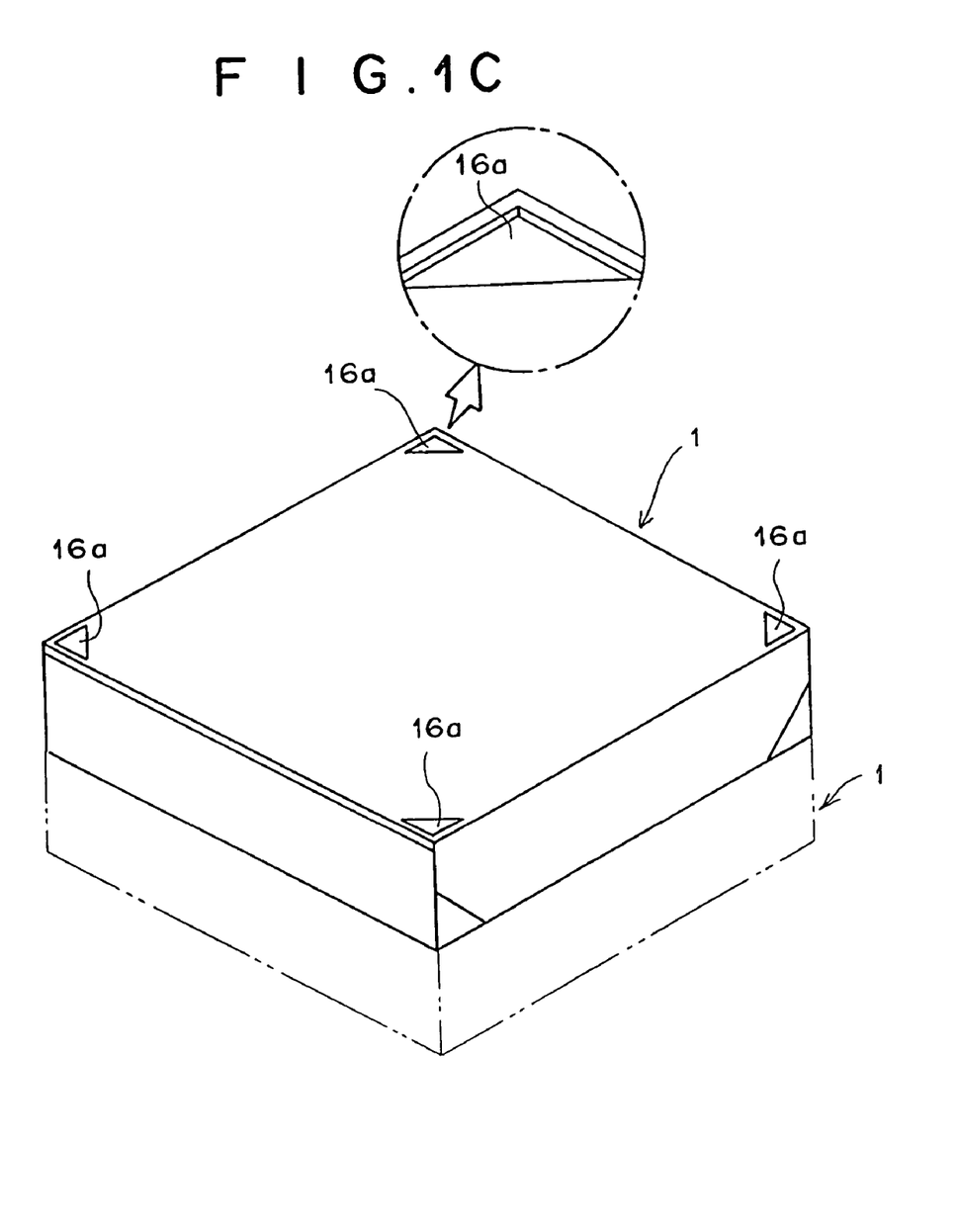

In FIG. 1C, stopper recesses 16a are formed in the top surface of the housing case 1, and stopper protrusions (not shown) that are fitted into the stopper recesses 16a are formed on the bottom surface of the housing case 1.

In the stacked state of two housing cases 5, as shown in FIG. 3, the stopper protrusions 17 on the bottom surface 1b of the upper housing case 1 are fitted into the stopper recesses 16 which are part of the indicating portion 15 in the top surface 1a of the lower housing case 1. In the case where the height of the stopper protrusion 17 is lower than the depth of the stopper recess 16, the bottom surface 1b of the upper housing case 1 and the top surface 1a of the lower housing case 1 are stacked in contact with each other so that the stopper protrusion 17 is held by the longitudinal and transverse edges of the stopper recess 16. Thus, the positional shift, in the longitudinal and transverse directions, of the upper housing case 1 is regulated and the stacked state is maitained.

In the case where the height of the stopper protrusion 17 is higher than the depth of the stopper recess 16, the bottom surface 1b of the upper housing case 1 and the top surface 1a of the lower housing case 1 are stacked with a gap formed therebetween. Note that the protrusion-and-recess configuration may be reversed from the aforementioned case. That is, the top surface 1a and bottom surface 1b of the housing case 1 may have stopper protrusions and a stopper recess, respectively.

The first embodiment of the present invention has a uniform design, because it utilizes part of the indicating portion 15 to regulate positional shift during stacking.

Second Embodiment

Figure 4A:
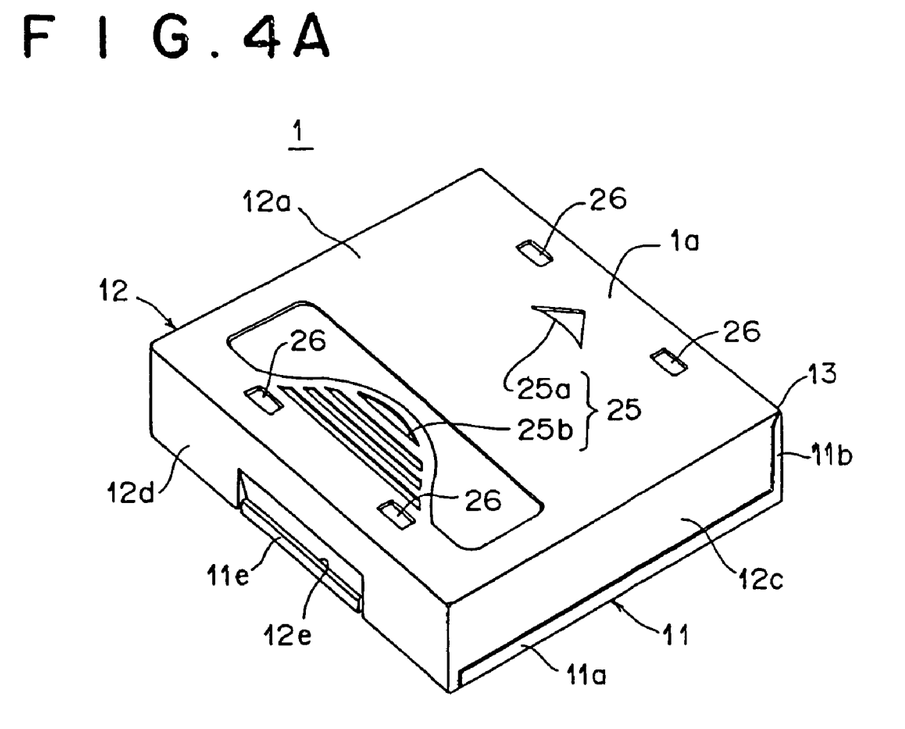
FIG. 4A is a perspective view of the top surface side of a cassette storing case according to a second embodiment of the present invention.
Figure 4B:
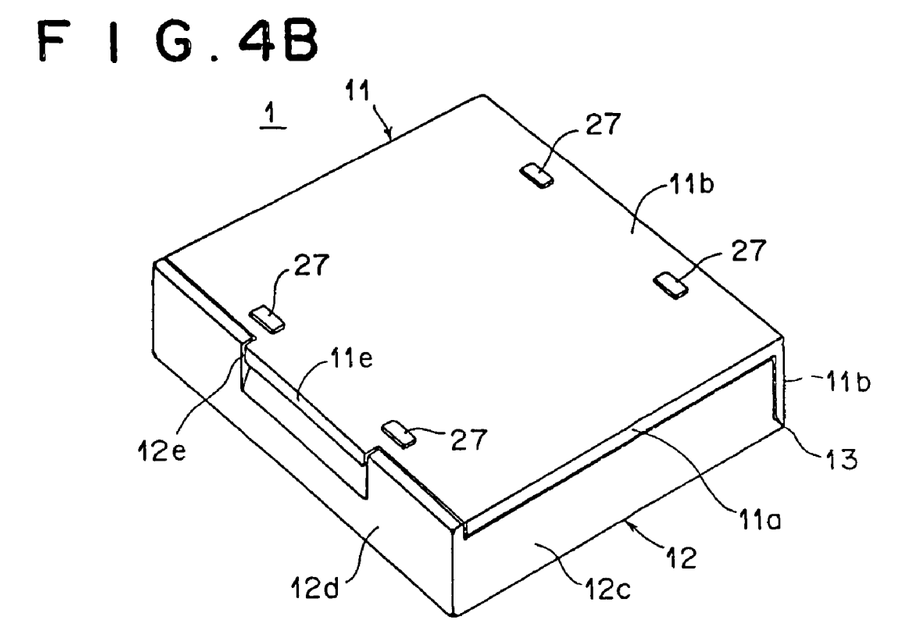
FIG. 4B is a perspective view of the bottom surface side of the cassette storing case according to the second embodiment of the present invention.
Figure 5:
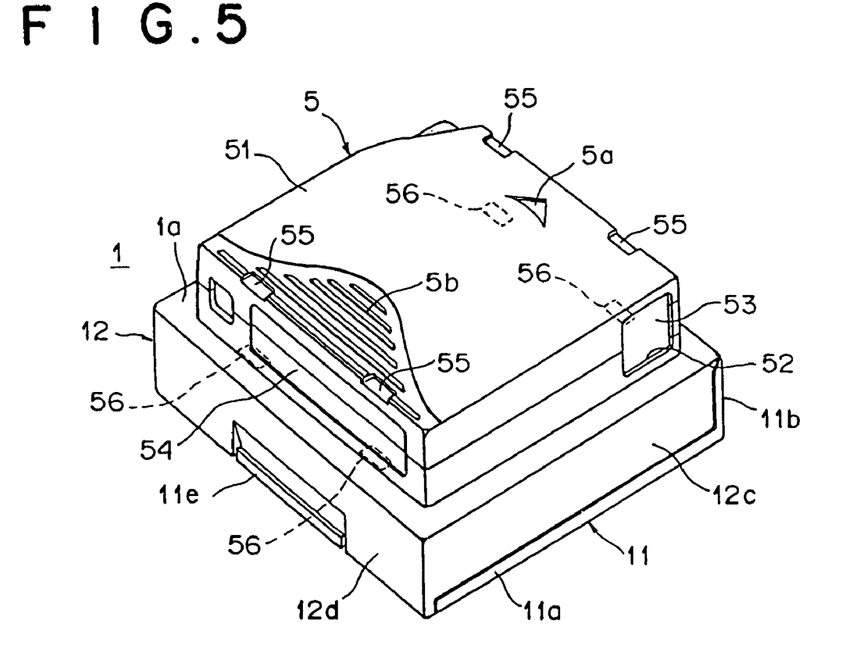
FIG. 5 is a perspective view of the state in which a cassette has been placed on the cassette storing case of FIG. 4.
Figure 6:
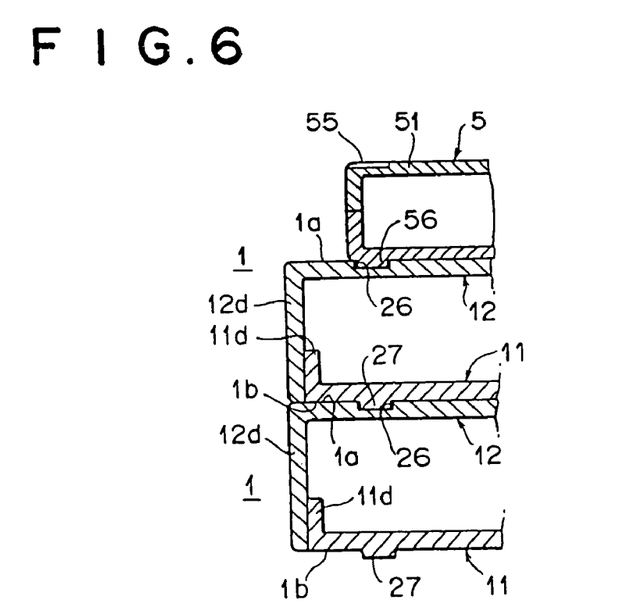
FIG. 6 is a part-sectional view of the state in which the cassette and two cassette storing cases have been stacked.

FIG. 4A shows a perspective view of the top surface side of a cassette storing case according to a second embodiment of the present invention, and FIG. 4B shows a perspective view of the bottom surface side of the cassette storing case according to the second embodiment. FIG. 5 shows a perspective view of the state in which a magnetic tape cassette has been placed on the cassette storing case. FIG. 6 shows a part-sectional view of the state in which the magnetic tape cassette and two cassette storing cases have been stacked.

The fundamental structure of the second embodiment and a magnetic tape cassette 5, excluding the case main body 11 of a cassette housing 1 and the top surface 1a and bottom surface 1b of a lid member 12, are the same as the first embodiment, so the same reference numerals will be applied to the same parts to omit a description of the same parts.

On the top surface 1a of the lid member 12 of the housing case 1, there is provided an indicating portion 25, similar to the design on the cassette 5 mentioned above, which has a protrusion-and-recess pattern indicating a housing direction. In the indicating portion 25 of the second embodiment, the top surface 1a is formed approximately flat and an arrow indication 25a, similar to the arrow indication 5a on the top surface of the aforementioned cassette 5 indicating the inserting direction of the cassette 5, is formed with a recess pattern in the rear portion of the lid member 12. Also, a protrusion-and-recess pattern 25b, similar to the protrusion-and-recess pattern 15b that becomes the holding portion of the aforementioned cassette 5, is formed in the front portion of the lid member 12. The indicating portion 25 enables recognition of the regular housing direction of the cassette 5 into the housing case 1.

In addition, the top surface 1a of the housing case 1 is provided with four stopper recesses 26 at positions corresponding to the four regulating recesses 55 which regulate positional shift on the top surface of the cassette 5 when the cassettes 5 are stacked with each other. On the other hand, the bottom surface 1b of the housing case 1 is provided with four engageable stopper protrusions 27 at positions corresponding to the stopper recesses 26 on the top surface 1a. With this arrangement, two cassettes 5, or two housing cases 1, are held with each other so that positional shift can be regulated, when they are stacked.

In the state in which the cassette 5 has been placed on the housing cases 1, as shown in FIGS. 4A, 4B, and 5, regulating protrusions 56 on the bottom surface 1b of the cassette 5 engage with the stopper recesses 26 in the top surface 1a of the housing case 1 to regulate positional shift. When the housing cases 1 are stacked with each other, the stopper protrusions 27 on the bottom surface 1b of the upper housing case 1 are fitted into the stopper recesses 26 in the lower housing case 1. Thus, the positional shift, in the longitudinal and transverse directions, of the upper housing case 1 is regulated and the stacked state is maintained.

In the second embodiment of the present invention, the structure for regulating positional shift of the cassette 5 placed on the housing case 1 temporarily or for display is used as the structure for regulating positional shift when housing cases 1 are stacked together.

According to the first and second embodiments, the top surface of the lid member 12 of the housing case 1 has the indicating portions 15 and 25 having a configuration similar to the design (i.e., the arrow indication 5a and protrusion-and-recess pattern 5b) corresponding to the housing direction of the cassette 5. Therefore, the first and second embodiments have the following advantages: the correspondence between the housing case 1 and a cassette of a type to be housed in the housing case 1 can be easily recognized at a glance; housing in an incorrect direction can be prevented, because the housing direction can also be easily recognized by causing the designs of the housing case 1 and the cassette 5 to coincide with each other with respect to the housing direction; and damage to the cassette 5 and the housing case 1, which results from housing of the cassette 5 into a different housing case 1 and housing of the cassette 5 in an incorrect direction, can be prevented.

When taking out the cassette 5 from the housing case 1, the operation of opening the housing case 1 can be performed by pressing the finger hanging portion 11e downward with one of the hands and lifting the lid member 12 upward with the other hand. Thus, since there is no need to hold both sides of the bottom portion of the case main body 11 with one of the hands, the opening and closing operations are facilitated.

Note that the indicating portion 15 provided in the top surface 1a of the housing case 1 may be either the arrow indication 15a or the protrusion-and-recess pattern 15b. Similarly, the indicating portion 25 may be either the arrow indication 25a or the protrusion-and-recess pattern 25b. Also, instead of forming the finger hanging portion 11e in the front central portion of the bottom plate 11a, finger hanging portions may be formed in the front right and left portions. In that case, it is preferable to provide an engagement structure, which engages with the front end of the bottom plate 11a of the case main body 11 to maintain the closed state of the lid member 12, in the lower end of a member which extends downward from the lower central portion of the front wall 12d of the lid member 12.

Third Embodiment

Figure 7:
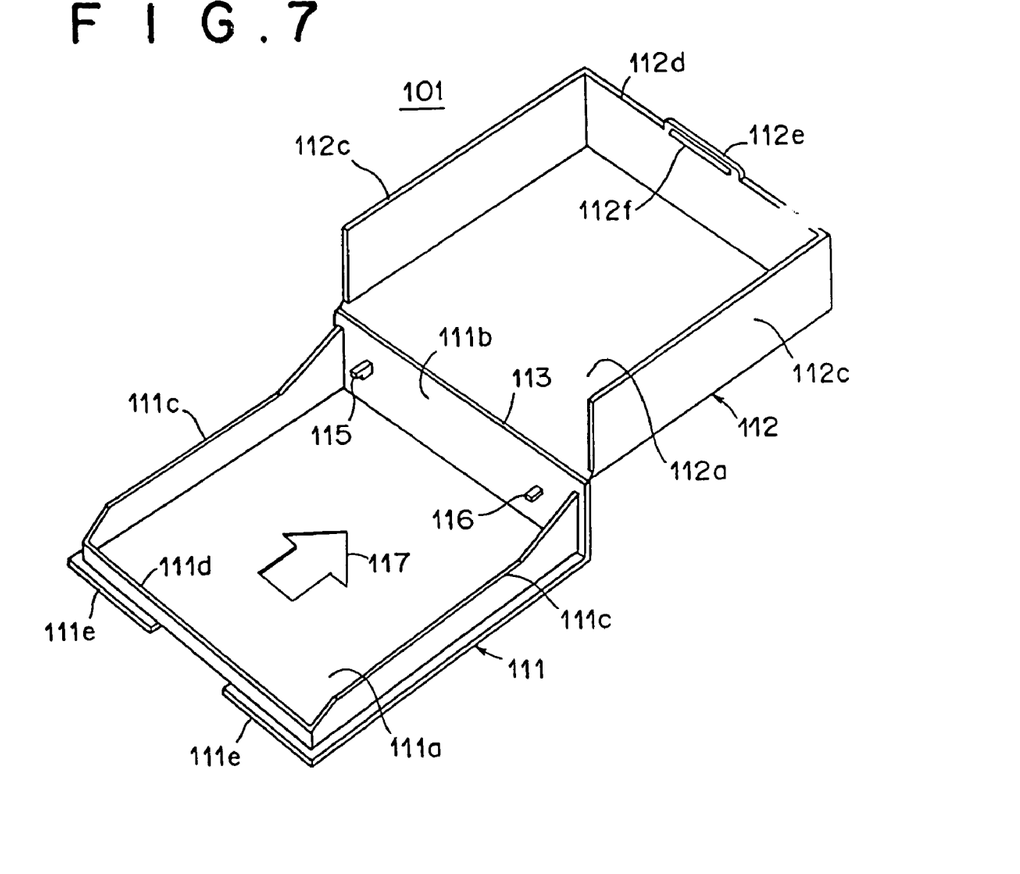
FIG. 7 is a perspective view of the state in which the lid of a cassette storing case according to a third embodiment of the present invention is open.
Figure 8:
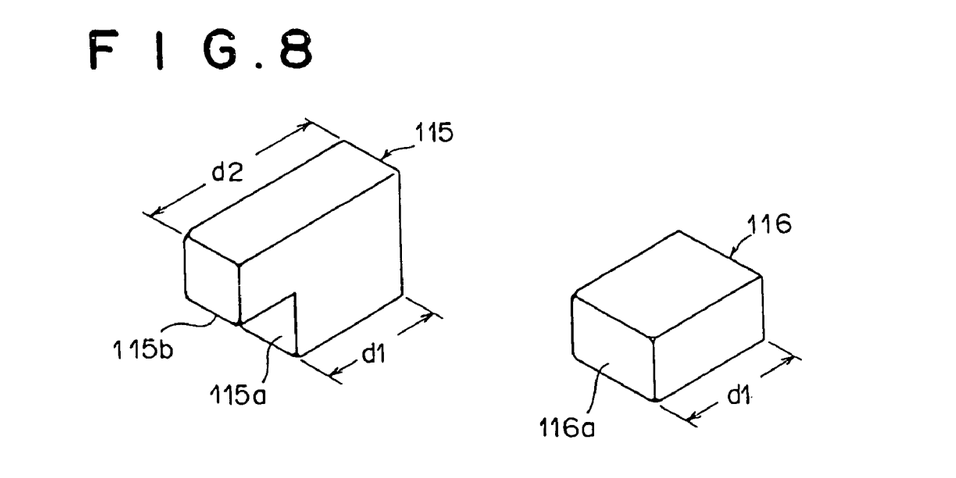
FIG. 8 is an enlarged perspective view of the first and second protrusions of FIG. 7.
Figure 9:
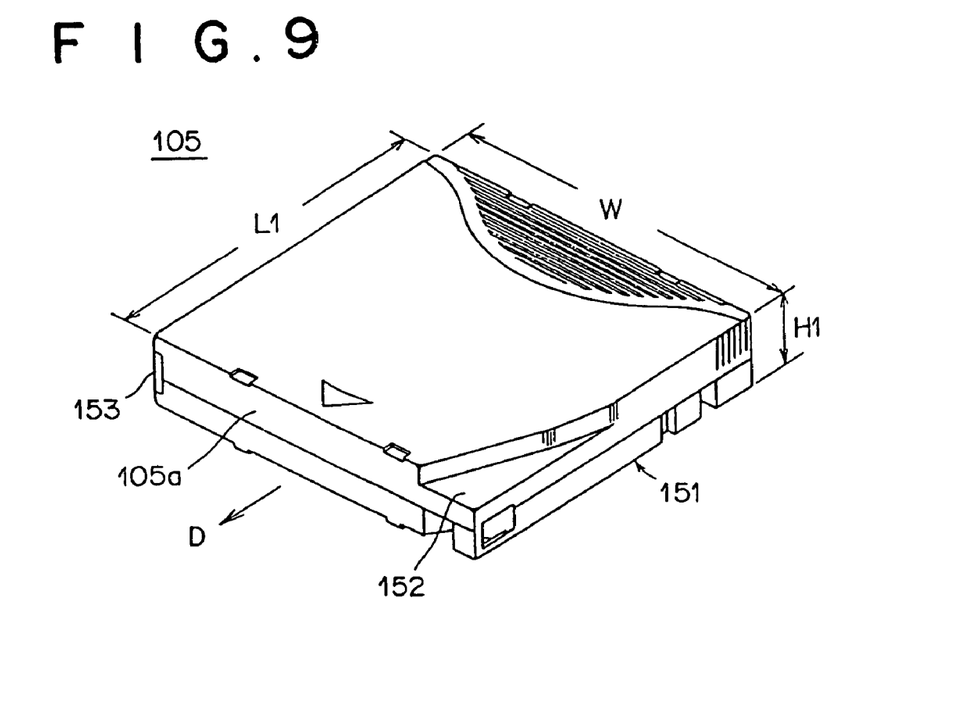
FIG. 9 is a perspective view of a first cassette.
Figure 10:
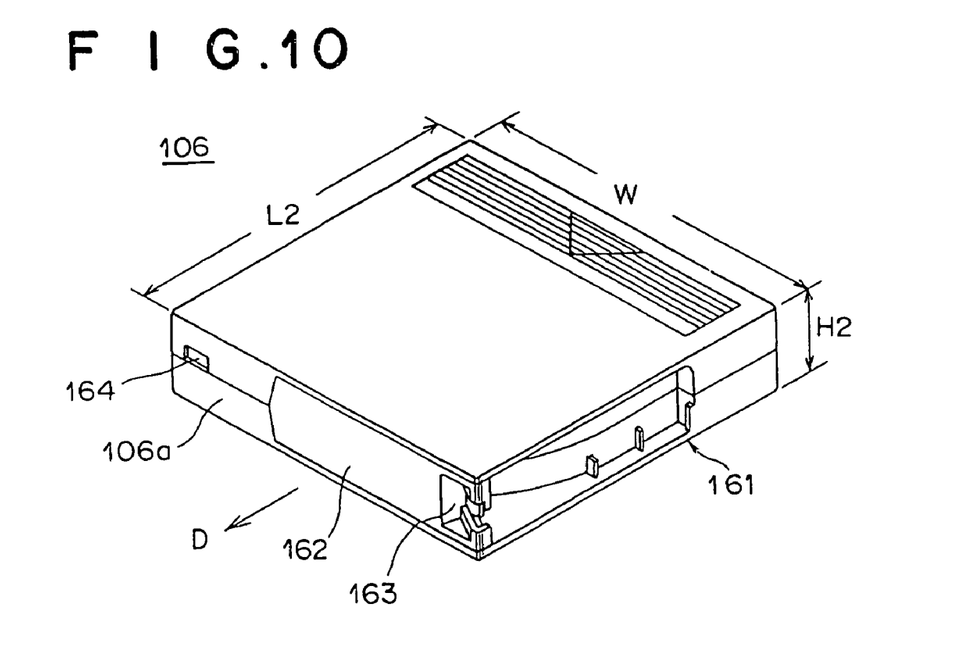
FIG. 10 is a perspective view of a second cassette.

A third embodiment for achieving the second object of the present invention above mentioned will hereinafter be described with reference to the drawings. FIG. 7 shows a perspective view of the state in which the lid of a cassette storing case according to the third embodiment of the present invention is open. FIG. 8 shows an enlarged perspective view of protrusions shown in FIG. 7. FIG. 9 shows a perspective view of a first cassette and FIG. 10 shows a perspective view of a second cassette. In the third embodiment, two types of cassettes 105 and 106 differing in outside dimensions are housed in a cassette storing case 101. The cassette storing case 101 houses the cassettes 105 and 106 so that these cassettes cannot be moved in the interior.

The cassette storing case 101 consists of a lower case main body 111 and an upper lid member 112. The lid member 112 is connected to the lower main body 111 through a thin connecting portion 113 so that it can be closed and opened with respect to the lower main body 111. The cassette storing case 101 is capable of housing the first and second cassettes 105 and 106 (magnetic tape cassettes) shown in FIGS. 9 and 10.

In the case main body 111, a vertical wall 111b is erected in the rear end of a flat bottom plate 111a. Also, right and left side walls 111c are erected inside the side ends of the bottom plate 111a so that they become lower in height toward the front end of the bottom plate 111a. In addition, a front wall 111d is formed low in the front end of the bottom plate 111a. The space inside these walls 111b to 111d is used for housing the cassette 105 or 106. Furthermore, right and left finger hanging portions 111e are formed to protrude from the front right and left ends of the bottom plate 111a excluding the front central portion.

On the other hand, in the lid member 112, one end of a flat top plate 112a is connected to the top edge of the vertical wall 111b of the case main body ill through the thin connecting portion 113 so that it is opened and closed with respect to the bottom plate 111a of the case main body 111. Also, side walls 112c are erected in both side ends of the top plate 112a, and a front wall 112d is erected in the front end of the top plate 112a opposite to the thin connecting portion 113. Dimensions are set so that the side walls 112c and front wall 112d of the lid member 112 are fitted onto the side walls 111c and front wall 111d of the case main body 111; the lower ends of the side walls 112c and front wall 112d of the lid member 112 abut the top surface of the bottom plate 111a of the case main body 111; and in the closed state of the lid member 112, the bottom plate 111a and the top plate 112a are parallel with each other.

The lower central portion of the front wall 112d of the lid member 112 is provided with an engaging piece 112e, which corresponds to the front central portion, between the finger hanging portions 111e, of the case main body 111. The inside surface of the engaging piece 112e is provided with a tapered engaging protrusion 112f. In the closed state of the lid member 112, the engaging piece 112e is inserted between the finger hanging portions 111e, and the engaging protrusion 112f engages with the front end of the case main body 111 to keep the closed state of the lid member 112. Also, the finger hanging portions 111e are projected beyond the front wall 112d of the lid member 112.

In the inside wall surface of the vertical wall 111b of the back portion in the direction of inserting a cassette into the case main body 111 (indicated on the bottom plate 111a by an arrow pattern 117), first and second protrusions 115 and 116 are provided to extend in the inserting direction. As shown in FIG. 8, the first protrusion 115 is long in the vertical direction and has an abutting end face 115a at the lower front face thereof, away from the vertical wall 111b by a distance of d1. The first protrusion 115 also has an abutting bottom face 115b at the bottom face of a portion projected from the vertical wall 111b by a distance of d2. The second protrusion 116 is long in the transverse direction and has an abutting end face 116a at the front face thereof, away from the vertical wall 111b by the distance of d1.

The first cassette 105 that is housed within the housing case 101 is an LTO cassette. In the first cassette 105, a single reel (not shown) with magnetic tape wound thereon is rotatably housed within a generally square cassette case 151. As shown in FIG. 9, the cassette case 151 consists of an upper half and a lower half, made of plastic. The cassette case 151 has flat top and bottom surfaces. The first cassette 105 has, for example, a width W of 105.4 mm, an inserting-direction length L1 of 102.0 mm, and a height (or thickness) H1 of 21.5 mm. The front surface 105a in the inserting direction D of the cassette case 151 is approximately flat. The left side surface in the inserting direction D of the cassette case 151 is provided with a stepped portion 152. The top surface of the stepped portion 152 is formed low so that insertion in an incorrect direction can be prevented. The right side surface of the cassette case 151 has an opening (not shown) for pulling out one end of the magnetic tape from the cassette case 151. The opening is opened or closed by a slide door 153 that slides in the inserting direction D. Note that the stepped portion 152 is provided for preventing the cassette 105 from being inserted into a drive unit of a computer in an incorrect posture.

The second cassette 106 that is housed within the housing case 101 is a DTL cassette. In the second cassette 106, a single reel (not shown) with magnetic tape wound thereon is rotatably housed within a generally square cassette case 161. As shown in FIG. 10, the cassette case 161 consists of an upper half and a lower half, made of plastic. The cassette case 161 has flat top and bottom surfaces. The second cassette 106 has, for example, a width W of 105.4 mm, an inserting-direction length L2 of 105.8 mm, and a height (or thickness) H2 of 25.4 mm. The front surface 106a in the inserting direction D of the cassette case 161 is approximately flat. The left side surface in the inserting direction D of the cassette case 161 is provided with a door 162, which rotates to open or close an opening for pulling out magnetic tape. The proximal portion of the door 162 is provided with a first recess 163 formed in the front surface 106a. The front surface 106a on the opposite side (i.e., on the right side) has a second recess 164 bored in the case 161. As described above, the outside dimensions of the first and second cassettes 105 and 106 are the same in width W, but the first cassette 105 is smaller in inserting-direction length L and height H. The housing space in the cassette storing case 101 is formed into a size along the external form of the second cassette 106. Therefore, when housing the first cassette 105 into the housing case 101, space is formed in the inserting direction and height direction. However, movement of the first cassette 105 is regulated by the first and second protrusions 115 and 116.

That is, the projected length d1 of the abutting end faces 115a and 116a of the first and second protrusions 115 and 116 is formed into a difference L2−L1 in the inserting direction between the first cassette 105 and the second cassette 106. The abutting end faces 115a and 116a abut the front surface 105a of the first cassette 105. The first protrusion 115 is provided at a position corresponding to the stepped portion 152 of the first cassette 105 and the first recess 163 in the front surface 106a of the second cassette 106, and the abutting bottom face 115b of the first protrusion 115 is disposed at a position equivalent to the height of the top surface of the stepped portion 152 of the first cassette 105. Thus, the abutting bottom face 115b of the first protrusion 115 abuts the top surface of the stepped portion 152 of the first cassette 105. Furthermore, the projected length d2 of the first protrusion 115 is formed into a dimension that is inserted into the first recess 163 of the second cassette 106. The transverse position and height of the second protrusion 116 are determined so that it can be inserted into the second recess 164 of the front surface 106a of the second cassette 106. Thus, the first and second protrusions 115 and 116 do not interfere with the second cassette 106.

Figure 11A:
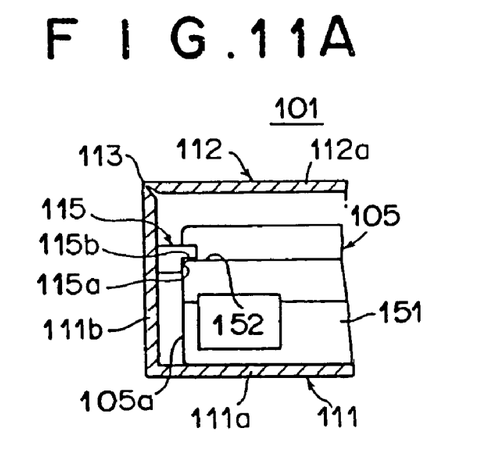
FIG. 11A is a diagrammatic sectional view of the first protrusion in the state in which the first cassette has been housed in the cassette storing case of FIG. 7.
Figure 11B:
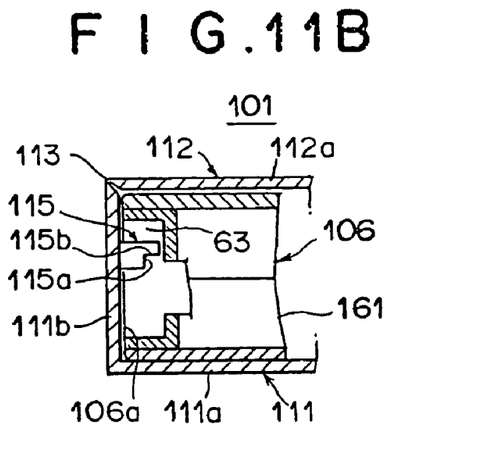
FIG. 11B is a diagrammatic sectional view of the first protrusion in the state in which the second cassette has been housed in the cassette storing case of FIG. 7.

With the structure mentioned above, the housed state of the first cassette 105 is shown in FIG. 11A. That is, in the first protrusion 115 of the cassette storing case 101, the abutting end face 115a abuts the front surface 105a of the stepped portion 152 of the first cassette 105, while the abutting bottom surface 115b abuts the top surface of the stepped portion 152. In this manner, the movement of the front surface 105a of the first cassette 105 in the inserting direction D is regulated at a position away from the vertical wall 111b, and the upward movement is regulated at a position corresponding to the top surface of the stepped portion 152. The housed state of the second cassette 106 is shown in FIG. 11B. As shown in the figure, the first protrusion 115 is inserted into the first recess 163 of the second cassette 106, and the second cassette 106 is housed with the front surface 106a in close proximity to the vertical wall 111b and the top surface in close proximity to the top plate 112a.

Figure 12A:
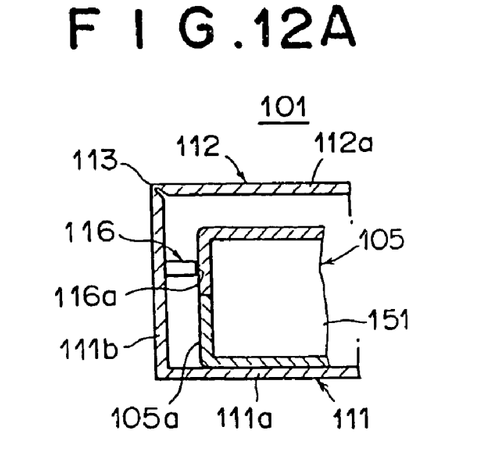
FIG. 12A is a diagrammatic sectional view of the second protrusion in the state in which the first cassette has been housed in the cassette storing case of FIG. 7.
Figure 12B:
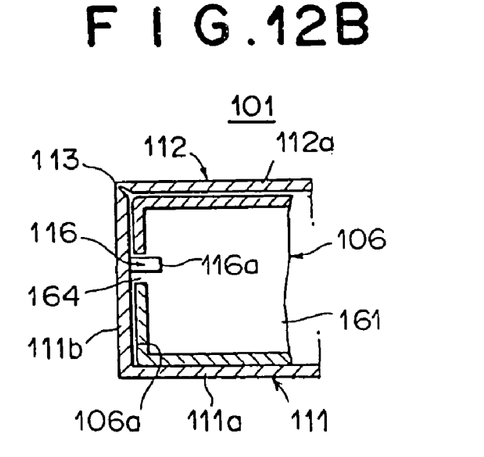
FIG. 12B is a diagrammatic sectional view of the second protrusion in the state in which the second cassette has been housed in the cassette storing case of FIG. 7.

The housed state of the first cassette 105 is also shown in FIG. 12A. As shown in the figure, the abutting end face 116a of the second protrusion 116 abuts the front surface 105a of the first cassette 105, whereby the movement of the front surface 105a of the first cassette 105 in the inserting direction D is regulated at a position away from the vertical wall 111b. The housed state of the second cassette 106 is also shown in FIG. 12B. As shown in the figure, the second protrusion 116 is inserted into the second recess 164 of the second cassette 106, and the second cassette 106 is housed with the front surface 106a in close proximity to the vertical wall 111b and the top surface in close proximity to the top plate 112a. In this manner, the cassette storing case 101 is capable of housing the first cassette 105 and second cassette 106 which differ in outside dimensions, without moving them in the interior thereof.

If the first cassette 105 is inserted into the cassette storing case 101 in a direction incorrect in fore-and-aft or top-and-bottom orientation, the outer end of the first protrusion 115 abuts the inserted front surface of the first cassette 105, because the stepped portion 152 is not present at the position corresponding to the first protrusion 115. Thus, the first cassette 105 cannot be housed. If the first cassette 105 is inserted in the transverse direction, the first and second protrusions 115 and 116 abut the inserted front surface of the first cassette 105, because the width W is greater than the inserting-direction length L1. Thus, the first cassette 105 cannot be housed. In this manner, the housing of the first cassette 105 in incorrect directions is prevented. If the second cassette 106 is similarly inserted in a direction incorrect in fore-and-aft or top-and-bottom, or in the transverse direction, the outer ends of the first and second protrusions 115 and 116 abut the inserted front surface of the second cassette 106, because the recesses 163 and 164 are not present at the positions corresponding to the first and second protrusions 115 and 116. Thus, the second cassette 106 cannot be housed and the housing of the second cassette 106 in incorrect directions is prevented.

When taking out the cassette 105 or 106 from the cassette storing case 101, the operation of opening the housing case 101 can be performed by pressing the finger hanging portion 111e downward with one of the hands, and unlocking the engagement of the engaging piece 112e and lifting the lid member 112 upward with the other hand. Thus, since there is no need to hold both sides of the bottom portion of the case main body 111 with one of the hands, the opening and closing operations are facilitated.

While the abutting end face 115a and abutting bottom face 115b of the first protrusion 115 are provided as one body, they may be formed into separate protrusions. In addition, while the finger hanging portions 111e are provided in the front right and left portions of the case main body 111, a single finger hanging portion may be provided in the front central portion of the case main body 111. In that case it is preferable to provide a cutout in the lower central portion of the front wall 112d of the lid member 112 so that the finger hanging portion is exposed.

As has been described above, the cassette storing case of the third embodiment of the present invention is capable of housing the first and second cassettes 105 and 106 which are nearly the same in width but different in inserting-direction length and height. The first cassette 105 is smaller in inserting-direction length and height than the second cassette 106. The rear wall surface 111b in the cassette inserting direction is provided with the first protrusion 115 which has an abutting end face 115a engageable with the front surface 105a of the first cassette 105 and an abutting bottom surface 115b engageable with the top surface of the first cassette 105. Furthermore, the first and second protrusions 115 and 116 are inserted into the recesses 163 and 164 in the front surface 106a of the second cassette 106 so that they do not interfere with the front surface 106a of the second cassette 106.

The invention claimed is:

1. A cassette storing system comprising:
   a) a housing case including:
   an upper lid member having a top plate provided with case stopper recesses and a protrusion-and-recess pattern, and
   a first lower case main body having a bottom plate provided with case stopper protrusions; and
   b) a cassette having a reel and a magnetic tape, said cassette including:
   a top surface provided with a protrusion-and-recess pattern and cassette stopper recesses, and
   a bottom surface provided with cassette stopper protrusions;
   wherein the protrusion-and-recess pattern on the housing case indicates a cassette housing direction and is similar to the protrusion-and-recess pattern on the cassette;
   wherein
   1) when the upper lid member of the housing case is in a closed position with respect to the lower case main body, the cassette is not within the housing case, and the housing case is stacked on top of the cassette,
   the case stopper protrusions are fitted into the cassette stopper recesses , and 2) when the upper lid member of the housing case is in a closed position with respect to the lower case main body, and the cassette is stacked on top of the housing case, the cassette stopper protrusions are fitted into the case stopper recesses.

2. The cassette storing system of claim 1, wherein said first upper lid member includes a front wall and the front wall is transparently formed.

3. The cassette storing system of claim 2, wherein said cassette further comprises a pasting region on which a bar code label is positioned, and wherein when said cassette is provided within the housing case, the bar code label can be read out.

4. The cassette storing system of claim 1, wherein the longitudinal and transverse dimensions of the cassette are similar.

5. The cassette storing system of claim 4, wherein said first upper lid member includes a front wall and the front wall is transparently formed.

6. The cassette storing system of claim 5, wherein said cassette further comprises a pasting region on which a bar code label is positioned, and wherein when said cassette is provided within the housing case, the bar code label can be read out.

* * * * *